(12) United States Patent
Pedersen

(10) Patent No.: US 9,163,895 B2
(45) Date of Patent: Oct. 20, 2015

(54) ARROW QUIVER ASSEMBLY AND FRAME

(71) Applicant: Out RAGE, LLC, Proctor, MN (US)

(72) Inventor: William Edward Pedersen, Duluth, MN (US)

(73) Assignee: Out RAGE, LLC, Cartersville, GA (US)

( * ) Notice: Subject to any disclaimer, the term of this patent is extended or adjusted under 35 U.S.C. 154(b) by 58 days.

(21) Appl. No.: 13/736,694

(22) Filed: Jan. 8, 2013

(65) Prior Publication Data

US 2013/0174824 A1 Jul. 11, 2013

Related U.S. Application Data

(60) Provisional application No. 61/584,433, filed on Jan. 9, 2012.

(51) Int. Cl.
| F41B 5/06 | (2006.01) |
|---|---|
| B23P 15/00 | (2006.01) |
| B23P 13/04 | (2006.01) |
| B21C 23/00 | (2006.01) |

(52) U.S. Cl.
CPC ............... F41B 5/066 (2013.01); B21C 23/00 (2013.01); B23P 13/04 (2013.01); B23P 15/00 (2013.01); F41B 5/06 (2013.01); *Y10T 29/49826* (2015.01)

(58) Field of Classification Search
USPC .................................................. 124/1, 80, 86
See application file for complete search history.

(56) References Cited

U.S. PATENT DOCUMENTS

| 4,020,984 | A | * | 5/1977 | Morris | 124/88 |
|---|---|---|---|---|---|
| 4,156,496 | A | * | 5/1979 | Stinson | 124/25.7 |
| 4,252,101 | A | * | 2/1981 | Spitzke | 124/45 |
| 5,215,070 | A |   | 6/1993 | Brown |  |
| 5,803,069 | A |   | 9/1998 | Schreiber |  |
| 6,390,085 | B1 | * | 5/2002 | Stinson | 124/86 |
| 6,564,791 | B1 |   | 5/2003 | Hammen |  |
| 6,672,299 | B2 |   | 1/2004 | Proctor |  |
| 6,691,694 | B2 | * | 2/2004 | Stinson | 124/86 |
| 6,845,765 | B1 | * | 1/2005 | Allshouse et al. | 124/86 |
| 7,464,908 | B2 |   | 12/2008 | Files |  |
| 7,987,842 | B2 | * | 8/2011 | McPherson | 124/86 |
| 2003/0140913 | A1 | * | 7/2003 | Stinson | 124/86 |
| 2006/0112945 | A1 | * | 6/2006 | Rager | 124/86 |
| 2008/0251059 | A1 | * | 10/2008 | McPherson | 124/44.5 |
| 2008/0302346 | A1 | * | 12/2008 | Notestine | 124/25.7 |
| 2010/0300421 | A1 | * | 12/2010 | LoRocco | 124/86 |

* cited by examiner

*Primary Examiner* — John E Simms, Jr.
(74) *Attorney, Agent, or Firm* — Covington & Burling LLP; Gregory S. Discher; Grant D. Johnson

(57) ABSTRACT

A frame is provided, and a quiver assembly is attached to the frame. The frame, preferably made from aluminum, is manufactured by using an axis of extrusion that is perpendicular to the primary axis of the quiver assembly. A top portion of the quiver assembly provides blade covers with foam inserts to store, for example, expandable broadheads. The blade covers are non-circular in shape, so that broadheads can be rotated approximately ninety degrees to a secure position. The quiver also utilizes a set screw that allows a the hunter to adjust the camming force required for loading and unloading the quiver from the bow. The quiver assembly utilizes rubber posts that allow for a quiet operation, as well as a secure means of locking the quiver assembly to a bow.

17 Claims, 12 Drawing Sheets

ARROW QUIVER ASSEMBLY AND FRAME

CROSS-REFERENCE TO RELATED APPLICATIONS

This application claims the benefit under 35 U.S.C. §119 (e) of U.S. Provisional Patent Application No. 61/584,433, filed Jan. 9, 2012, herein incorporated by reference in its entirety.

FIELD OF EMBODIMENTS OF THE INVENTION

Embodiments of the present invention generally relate to arrow quiver assemblies and frames for archery. One or more embodiments of the quiver assembly has particularly advantageous blade covers, and utilizes a camming force to load and unload the quiver from the bow as well as particular techniques to manufacture the quiver frame.

BACKGROUND OF EMBODIMENTS OF THE INVENTION

One of the issues with expandable broadheads is that they can potentially rattle while in the quiver, or possibly allow the blades to predeploy while in the quiver. In order to address this concern, in one or more embodiments of the present invention, a quiver holds the blades of an expandable broadhead in the retracted and locked position. This is accomplished by providing foam inserts in the hood of the quiver that are an oval (or, more generally, a non-round) in shape. The arrow is inserted into the hood with the blades in line with the major axis of the opening in the foam. After insertion, the arrow is then rotated, which causes the foam to exert inward pressure on the blades, therefore stabilizing them to keep them from rattling or pre-deploying.

Another issue with known quiver assemblies is that they do not provide the user with the ability to adjust the camming force required for loading and unloading the quiver from the bow. One or more embodiments of the present invention advantageously provide the user with the ability to set a desired force that is required for loading and unloading the quiver from the bow.

Yet another problem with the manufacture of quiver frames is material waste and attendant increased cost. I have discovered a way to more cost-effectively manufacture quiver frames by utilizing an axis of extrusion that is perpendicular to the primary axis of the quiver assembly.

SUMMARY OF EMBODIMENT OF THE INVENTION

A frame is provided, and a quiver assembly is attached to the frame. The frame, preferably made from aluminum, is manufactured by using an axis of extrusion that is perpendicular to the primary axis of the quiver assembly. A top portion of the quiver assembly provides blade covers with foam inserts to store, for example, expandable broadheads. The blade covers have a non-round (e.g., oval) shape, so that broadheads can be rotated approximately ninety degrees to a secure position. The quiver assembly also utilizes a set screw that allows a hunter to adjust the camming force required for loading and unloading the quiver assembly from the bow. The quiver assembly utilizes rubber posts that allow for a quiet operation, as well as a secure means of locking the quiver assembly to a bow.

In one embodiment, a frame adapted for use with a quiver assembly is provided for holding and securing arrows. The frame includes: i) a horizontal top surface extending in a direction of a first axis; ii) a horizontal bottom surface extending in the direction of the first axis; iii) a first curved side surface with three points of inflection, wherein end points of the first curved surface contact a first endpoint of the horizontal top surface and a first endpoint of the horizontal bottom surface, wherein the first curved side extends in a direction of a second axis that is substantially perpendicular to the first axis; iv) a second curved side surface with three points of inflection, wherein end points of the second curved surface contact a second endpoint of the horizontal top surface and a second endpoint of the horizontal bottom surface, wherein the second curved side extends in the direction of the second axis; v) a horizontal surface positioned approximately midway between the horizontal top surface and the horizontal bottom surface, the horizontal surface having a first endpoint that contacts the first curved side surface and a second endpoint that contacts the second curved side surface; vi) a first curved surface extending in the direction of the first axis, having one point of inflection, and having respective endpoints contacting the first curved side surface and the second curved side surface; vii) a second curved surface extending in the direction of the first axis, having one point of inflection, and having respective endpoints contacting the first curved side surface and the second curved side surface, wherein the second curved surface is positioned between the horizontal bottom surface and the first curved surface.

In another aspect of the invention, the frame is manufactured by using an axis of extrusion that is substantially perpendicular to a plane formed by the first axis and the second axis.

DESCRIPTION OF EMBODIMENTS OF THE INVENTION

Figure 1:
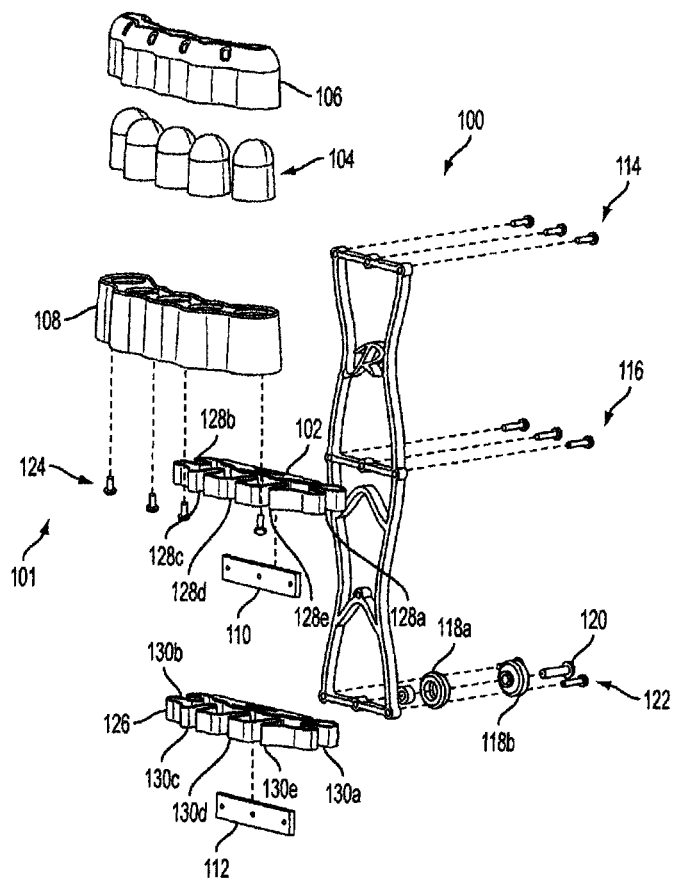
FIG. 1 is an exemplary exploded perspective view of an arrow quiver assembly and frame.

FIG. 1 is an exemplary exploded perspective view of a quiver frame 100 and quiver assembly 101. The quiver assembly 101 includes a hood 106 that contains inserts 104. The inserts 104 are preferably foam, and preferably have an oval (or other non-round) shape. The inserts 104 are inserted into various compartments of the cover 106. An arrow (not shown) is inserted through housing 108, and into the hood 106.

The blades are initially in line with the major axis of the opening of an insert 104. After the blade (on the arrow) is placed in the insert 104, the arrow is then rotated approximately 90 degrees, which causes the insert 104 to exert inward pressure on the blades, therefore stabilizing them to keep them from rattling or pre-deploying.

A top arrow shaft holder 102 is provided. The top arrow shaft holder 102 is secured to the quiver frame 100 by placing a plate 110 in an opening (not shown) on the underside of the arrow shaft holder 102, and securing the top arrow shaft holder 102 and plate 110 to the quiver frame 100 using screws 116. In one or more embodiments, top arrow shaft holder 102 is manufactured by placing the plate 110, which is preferably made from aluminum, in an injection mold, and having rubber injection molded around the plate 110.

Similarly, the bottom arrow shaft holder 126 is secured to the quiver frame 100 by placing a plate 112 in an opening (not shown) on the underside of the bottom arrow shaft holder 126, and securing the bottom arrow shaft holder 126 and plate 112 to the quiver frame 100 using screws 122. Top arrow shaft holder 102 and bottom arrow shaft holder 126 are preferably made from a compliant material, such as rubber, to facilitate insertion and removal of arrows from the arrow holding grooves 128a-e in top arrow shaft holder 102, and grooves 130a-e in bottom arrow shaft holder 126. In a preferred embodiment, the rubber can be a thermoplastic elastomer or IPE, such as Dynaflex G7980-9001-02, Shore A-80, Black, 0% regrind.

The housing 108 is preferably secured to the hood 106 using screws 124, and the hood 106 is preferably secured to the frame using screws 114.

The rubber mounting posts 118a, 118b for the quiver are preferably a compliant material, which advantageously provides for a more secure and quieter operation of adapting the quiver frame 100 and quiver assembly 101 to the bow (not shown), as will be described herein. Posts 118a, 118b can optionally be made as a single, integrated piece or unit. In one or more embodiments, the compliant material is a thermoplastic elastomer TPE, which can be injection molded, such as Dynaflex 7990-9001-02, 0% regrind, Shore A-90, Black. The compliant posts 118a, 118b allow the posts 118a, 118b to deform during the camming that is used to adapt the quiver frame 100 and quiver assembly 101 to a bow (not shown). The posts 118a, 118b are secured to the quiver frame 100, preferably using a pin 120. When posts 118a, 118b are made from a compliant material, they also advantageously provide for vibration damping in the bow assembly during a shooting operation.

Figure 2:
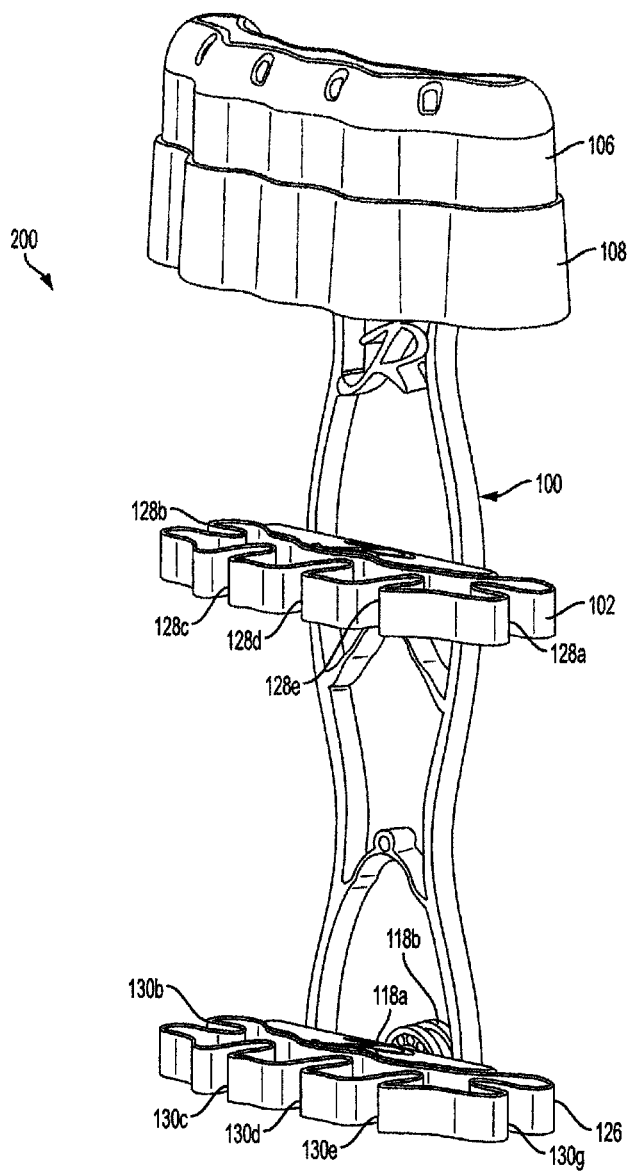
FIG. 2 is an exemplary perspective view of an arrow quiver assembly and frame.

FIG. 2, generally at 200, is an exemplary perspective view of a quiver frame 100 and quiver assembly 101. A plurality of arrow holding grooves 128a-e, 130e-e are respectively provided in the top arrow shaft holder 102 and the bottom arrow shaft holder 126 to facilitate holding arrows (not shown) in place.

Figure 3:
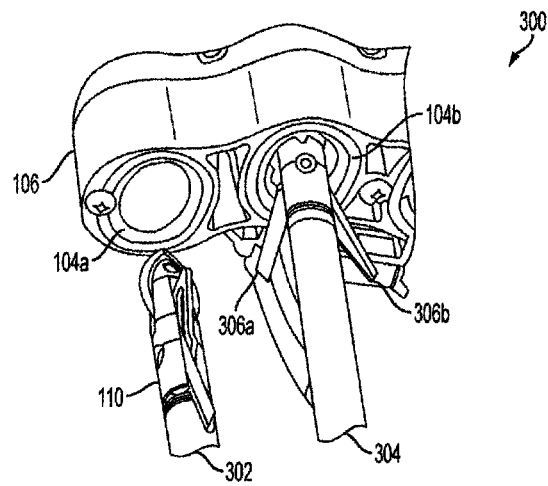
FIG. 3 is an exemplary perspective view of an arrow quiver assembly and frame, showing the relationship between arrows with broadheads and the arrow quiver assembly and frame.

FIG. 3, generally at 300, is an exemplary perspective view of an arrow quiver assembly 101 and quiver frame 100, showing the relationship between arrows 302, 304 with broadheads 110 and the quiver assembly 101 and quiver frame 100. As shown by arrow 304 and broadhead 110, arrow 304 and broadhead 110 have been rotated approximately 90 degrees clockwise (looking into the page) relative to arrow 302 and broadhead 110, which causes the insert 104b to exert inward pressure on the blades 306a, 306b, therefore stabilizing blades 306a, 306b to keep them from rattling or pre-deploying.

Figure 4:
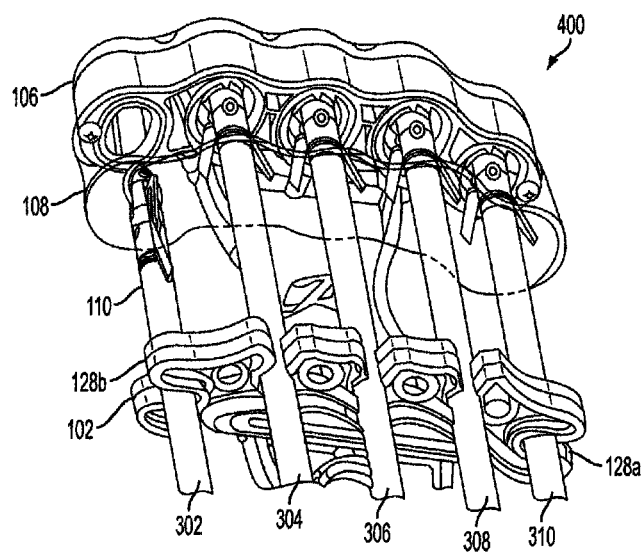
FIG. 4 is an exemplary perspective view of an arrow quiver assembly and frame, with arrows respectively inserted in arrow holding grooves.

FIG. 4, generally at 400, is an exemplary perspective view of an arrow quiver assembly 101 and quiver frame 100, with arrows 302, 304, 306, 308, 310 respectively inserted in arrow holding grooves 128a-e. As shown, arrows 306, 308, 310, along with arrow 304, are also rotated approximately 90 degrees clockwise (looking into the page) relative to arrow 302 and broadhead 110.

Figure 5:
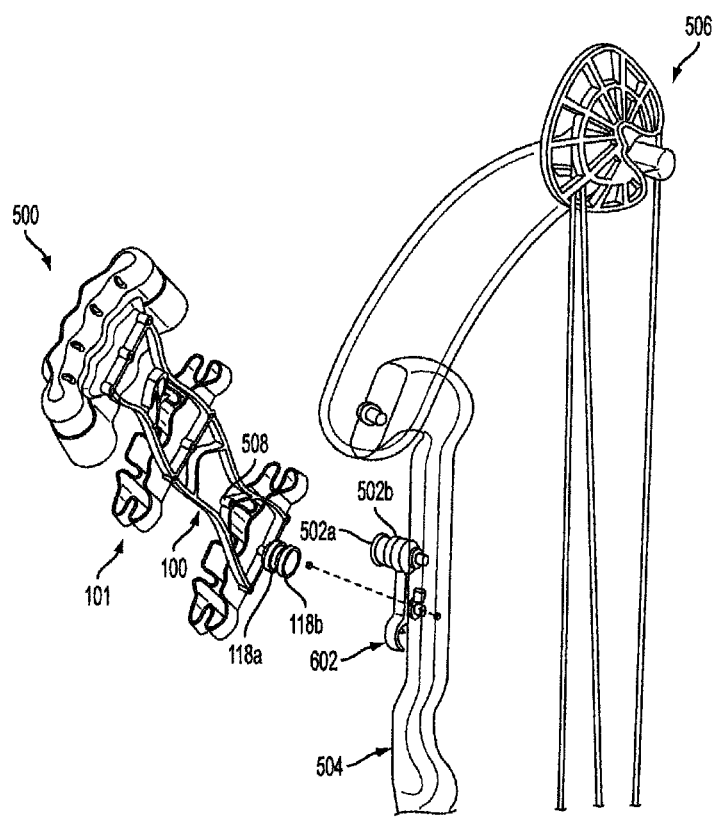
FIG. 5 is an exemplary perspective view of a quiver assembly and frame in relation to a bow.

FIG. 5, generally at 500, is an exemplary perspective view of a quiver assembly 101 and quiver frame 100 in relation to a bow 504. There are two rubber mounting posts 118a, 118b associated with the frame 100 and the quiver assembly 101. As noted above, posts 118a, 118b can optionally be made as a single, integrated piece or unit. As previously discussed, rubber mounting posts 118a, 118b are mounted on the quiver assembly 101. In addition, rubber mounting posts 502a, 502b are mounted on the bow 504. The seating surface 508 on the quiver assembly 101 mates up with the rubber post 502a, 502b on the bow 504, and the calming surface (shown as element 602 in FIG. 6) on the bow 504 mount mates up with the rubber post 118a, 118b on the quiver assembly 101. This configuration advantageously mitigates or substantially eliminates the effects of any vibration, such that there is little or no vibration that is transmitted through the rubber mounting posts 118a, 118b and 502a, 502b. As a result, there is little or no vibration in the quiver assembly 101 and/or quiver frame 100 that prolongs any vibration in the how 504 after shooting the bow 504. In one embodiment, the hood 106 can include a pocket that receives a portion of the frame 100 such that frame 100 is held in the pocked using an adhesive. In this embodiment, the hood 106 is preferably secured to the frame using screws 114 when the frame 100 is held in the pocket.

Figure 6:
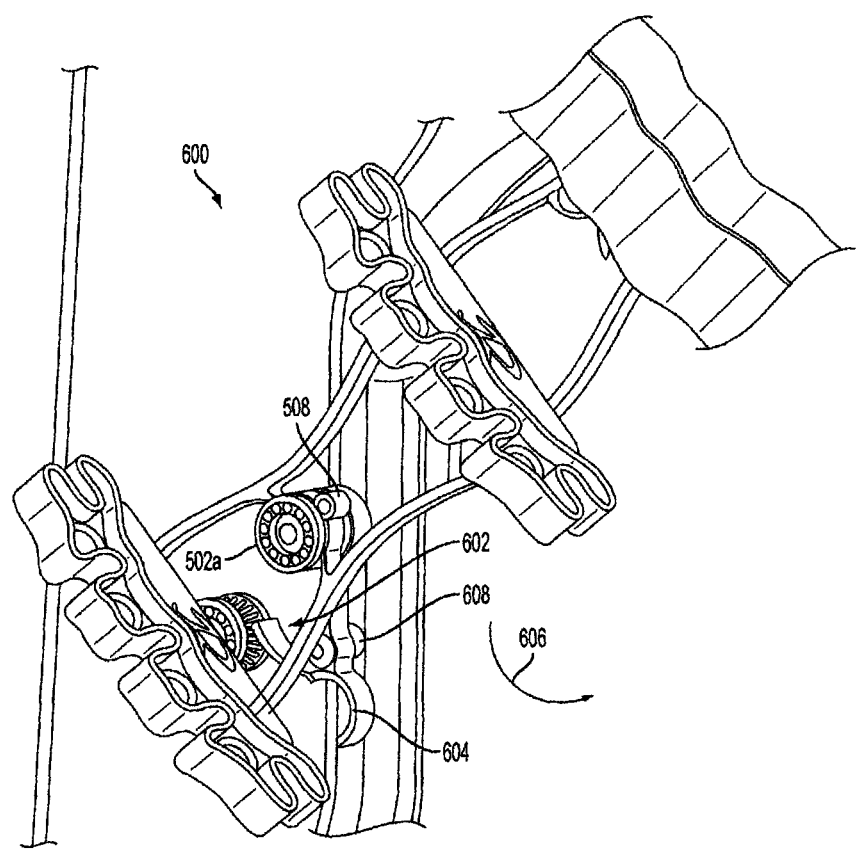
FIG. 6 is an exemplary perspective view of a quiver assembly placed on a bow in an unlocked position.
Figure 7:
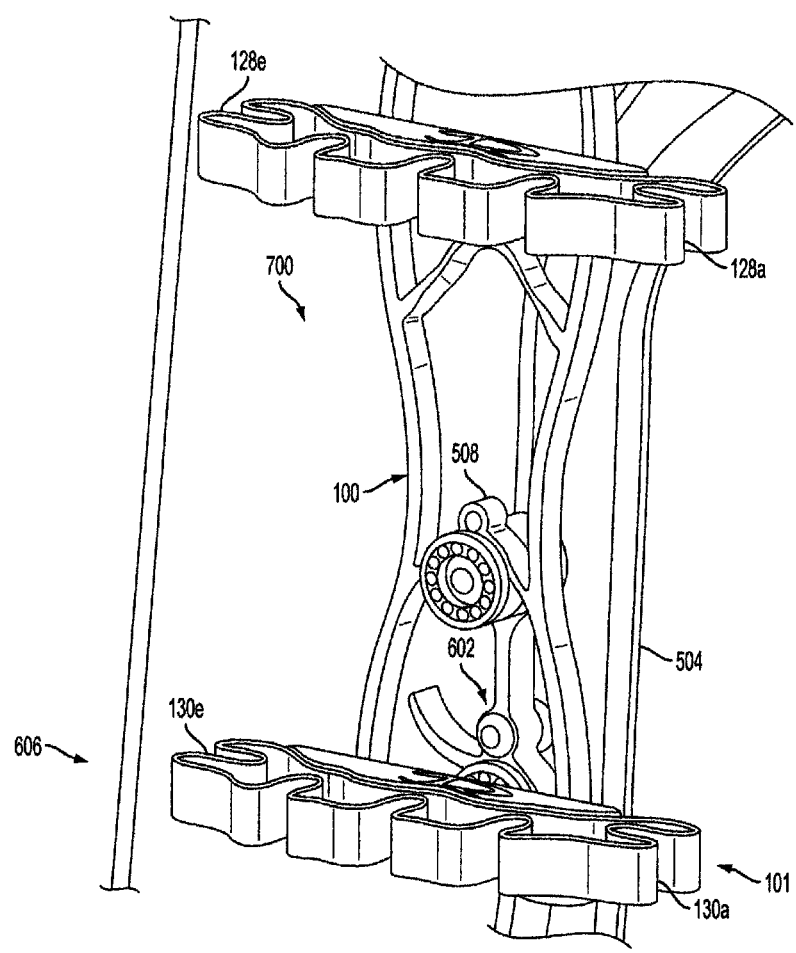
FIG. 7 is an exemplary perspective view of a quiver assembly placed on a bow in a locked position.

FIG. 6, generally at 600, is an exemplary perspective view of a quiver assembly 101 and quiver frame 100 placed on a bow 504, with the quiver assembly 101 and quiver frame 100 in an unlocked position. When the quiver assembly 101 and quiver frame 100 are attached to the bow 504, it is done so by placing the quiver assembly 101 and quiver frame 100 on a compliant rubber post 502a secured to the bow 504, and then camming the quiver assembly 101 and quiver frame 100 into a locked position. FIG. 7 is an exemplary perspective view of the quiver assembly 101 and quiver frame 100 that have been rotated into a locked position on the bow 504. That is, by rotating the quiver assembly 101 and quiver frame 100 in a counterclockwise direction as indicated by arrow 606, the quiver assembly 101 and quiver frame 100 will be rotated into a secure position, as shown in FIG. 7. Camming arm 602 is fixedly held in place by lower securing pin 608, which is secured to the bow 504.

In order to rotate the quiver assembly 101 and quiver frame 100 into the locked position as shown in FIG. 7, one or more embodiments of the present invention advantageously utilize a camming action with an appropriate amount of force that creates customer satisfaction. I have discovered that different customers will have different preferences with regard to the desired camming action force.

Figure 8:
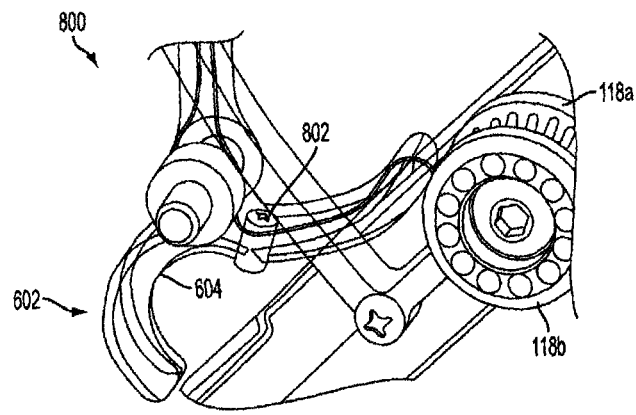
FIG. 8 is an exemplary perspective view of an arm with a set screw in a protruding position.

FIG. 8, generally at 800, is an exemplary perspective view of a camming arm 602 with a set screw 802 in a protruding position. In order to provide customers (e.g., hunters) with their personal preference, the camming lock position, as shown in FIG. 7, has an adjustable element, such as a set screw 802, to allow the camming force to be adjusted. Additionally, the set screw 802 can be adjusted after placing the quiver assembly 101 on the bow 504 so that the quiver assembly 101 will not be able to disconnect from the bow 504 without a significant force or through loosening the set screw 802. The set screw 802 is preferably a threaded set screw 802 that is positioned according to the user's preference by rotating the set screw along its primary axis until the adjustment is satisfactory. In one embodiment, the set screw can be utilized with, for example, a conventional chemical thread locker such as an epoxy to prevent unintentional movement of the set screw when, for example, vibration occurs. Alternatively, a mechanical thread locker such as a nylon insert can be used on the threads to prevent unintentional movement of the set screw when, for example, vibration occurs.

Figure 9:
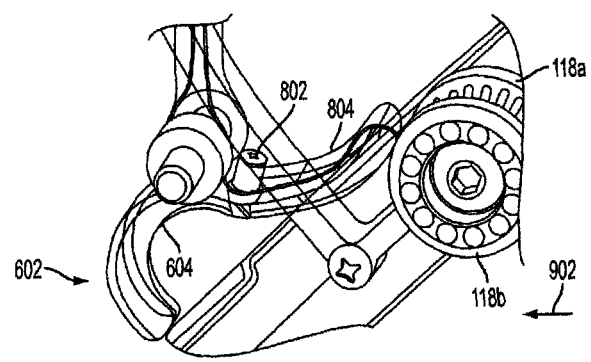
FIG. 9 is an exemplary perspective view of an arm with a set screw in a withdrawn position.

FIG. 9 is an exemplary perspective view of a camming arm 602 with a set screw 802 in a withdrawn position relative to the set screw 802 shown in FIG. 7. The rubber mounting posts 118a, 118b for the quiver assembly 101 and quiver frame 100 are designed to be a compliant structure, which allows for a more secure and quieter operation when the quiver assembly 101 and frame are rotated past the protruding set screw 802. Mounting posts 118a, 118b can also be made from any suitable thermoplastic vulcanizate (TPV), thermoplastic elastomer (TPE), thermoplastic polyurethane (TPU), or molded silicone. The purpose of the compliance is to allow at least the structure of the post 804 portion of camming arm 802 to deform during the camming operation to ensure a more snug fit. A camming operation generally occurs when the quiver assembly 101, quiver frame 100 and rubber mounting posts 118a, 118b are rotated in the direction of arrow 902, as shown in FIG. 9.

Figure 10:
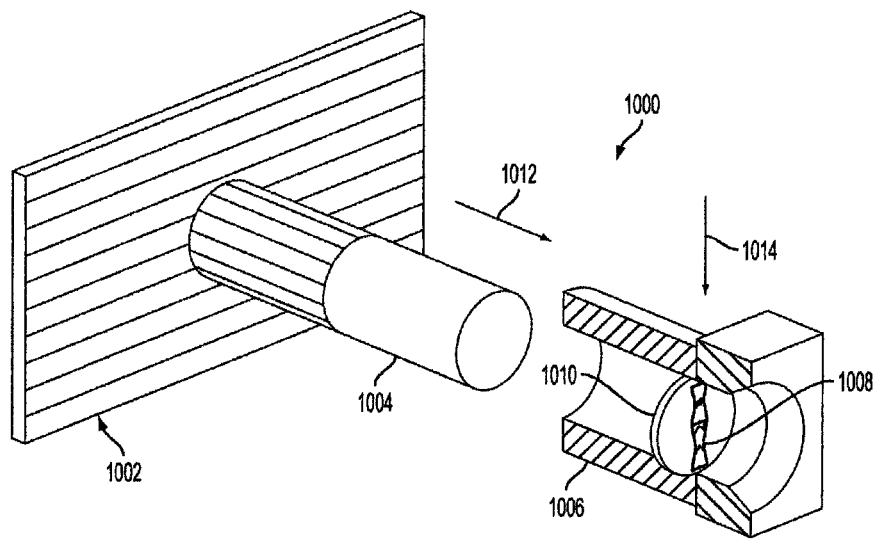
FIG. 10 is an exemplary perspective view of an extrusion system for creating a quiver frame.

FIG. 10, generally at 1000, is an exemplary perspective view of a conventional extrusion system for creating a quiver frame 100. In one or more embodiments, the quiver frame 100 is made from aluminum (6061-T6511). Magnesium, zinc and copper could also serve as a viable alternatives. The extrusion system 1000 is used to shape the material, such as aluminum, magnesium, zinc, or copper, by forcing the raw material bill 1004 to flow through a passage through the center portion of housing 1006, and then through a shaped opening 1008 in a die 1010. A main compartment 1002 receives hydraulic fluid which in, turn, is used to generate the desired pressure and movement of aluminum (or magnesium) in the passage through 1006.

Figure 11:
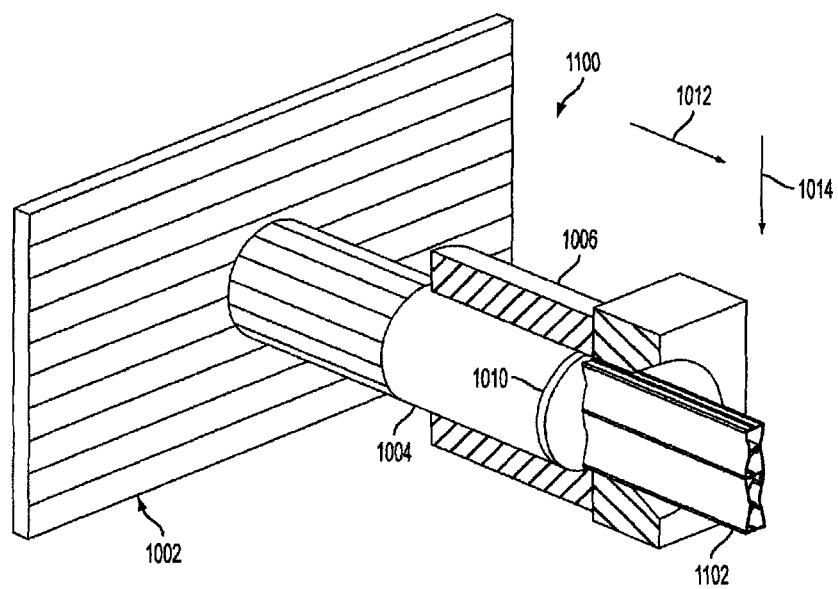
FIG. 11 is an exemplary cutaway view of the extrusion system of FIG. 10, showing the extrusion of a frame during operation.

FIG. 11, generally at 1100, is an exemplary cutaway view of the extrusion system 1000 of FIG. 10, showing the extrusion of a quiver frame cross-section 1102 during the extrusion operation.

Extruded material emerges as an elongated piece, such as a quiver frame cross-section 1102, with the same profile as the die opening 1008. The exit temperature of the extruded profile will be on the order of 950 degrees Fahrenheit. The extruded material is then cooled at an appropriate speed, and heat treated in accordance with known techniques to achieve the final desired material properties.

One or more embodiments of the present invention advantageously utilizes an extrusion process, and thereby produces relatively little material, waste as compared, for example, to a machining process, in which there is substantial material waste, or casting, in which the die costs can be expensive and the material properties are not generally as good as those provided by an extrusion process. This extrusion method of providing quiver frame cross-section 1102 creates the near net shape profile, which can then be very quickly and readily cut to length and finished. In contrast, known manufacturing methods, techniques and processes result in significantly greater material waste and processing time as the frame shape must be cut from a large rectangular piece of stock material, resulting in elevated costs and time.

With regard to FIG. 11, one or more embodiments of the present invention utilizes an extrusion process in which the axis of extrusion, as shown by arrow 1012, is substantially perpendicular to the primary axis of the quiver, as shown by arrow 1014. This technique creates a (relatively long) quiver frame cross-section 1102 that can then be simply cut off, for example, with a conventional bandsaw or cutoff saw to the required thickness of the finished frame 100. Some conventional post machining may be performed, but such machining is typically desired (or needed) only for threaded holes or mating surfaces for mounting. This extrusion process advantageously results in very little material waste or machining processing time, as the unused material that does not emanate from the passage through 1006 can be reused.

Figure 12:
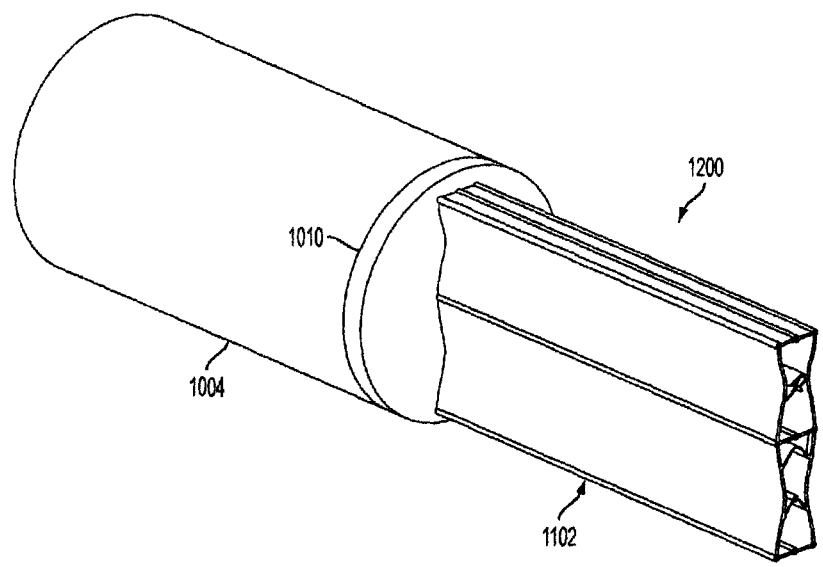
FIG. 12 is an exemplary extrusion billet, die and frame cross-section during extrusion process.

FIG. 12, generally at 1200, is an exemplary extrusion billet 1004, die 1010, and quiver frame cross-section 1102 during extrusion process.

Figure 13:
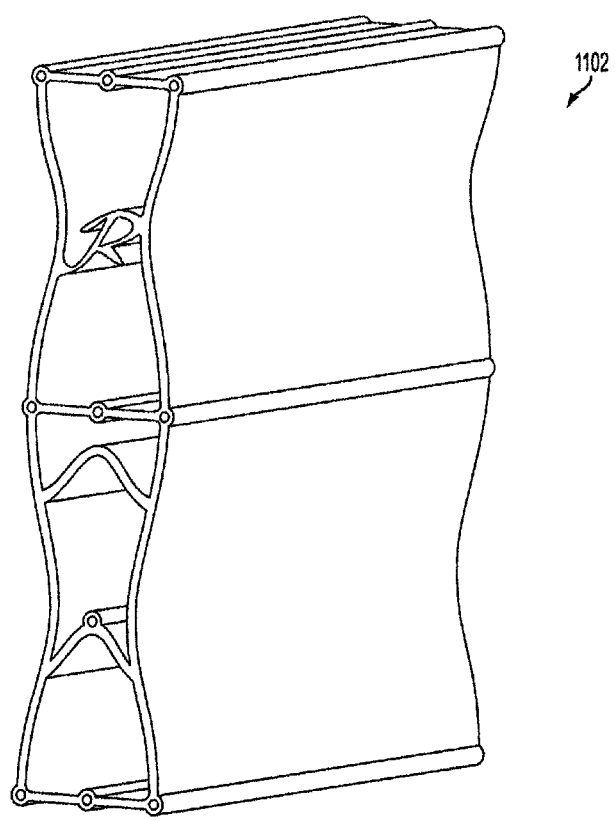
FIG. 13 is an exemplary quiver frame cross-section as extruded.

FIG. 13 is an exemplary quiver frame cross-section 1102 as extruded.

Figure 14:
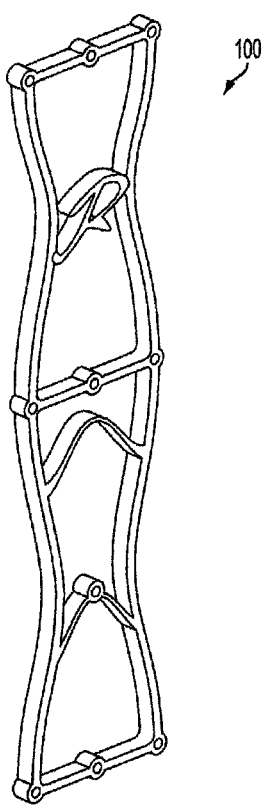
FIG. 14 is an exemplary quiver frame after having been cut to length.

FIG. 14 is an exemplary quiver frame 100 after having been cut to length in a conventional manner by using, for example, a bandsaw or cutoff saw.

The invention claimed is:

1. An arrow quiver assembly, comprising: a frame, the frame comprising:
   a first principal axis;
   a second principal axis of a length shorter than the first principal axis and extending in a direction substantially perpendicular to the first principal axis;
   wherein a hood is fixedly secured to the frame, the hood comprising a plurality of oval-shaped openings, wherein each of the plurality of oval-shaped openings receives a respective oval-shaped insert configured to receive a respective broadhead such that the blades of the broadhead are positioned substantially perpendicular to a plane formed by the first principal axis and the second principal axis and substantially in line with a major axis of the oval-shaped openings and oval-shaped inserts when the respective broadhead is initially inserted into the oval-shaped insert;
   wherein each respective oval-shaped insert does not exert inward pressure on the blades of the respective broadhead received in the oval-shaped insert when the blades of the broadhead are positioned substantially in line with the major axis of the oval-shaped insert, and
   each respective oval-shaped insert exerts inward pressure on the blades of the respective broadhead received in the oval-shaped insert when the broadhead is rotated in the oval-shaped insert so that the blades of the broadhead are positioned substantially in line with a minor axis of the oval-shaped insert.

2. The arrow quiver assembly according to claim 1, wherein the hood is secured to the frame using one or more screws.

3. The arrow quiver assembly according to claim 1, wherein the hood comprises a pocket that receives a portion of the frame.

4. The arrow quiver assembly according to claim 3, wherein an adhesive is used to secure the portion of the frame within the pocket.

5. The arrow quiver assembly according to claim 1, wherein each of the oval-shaped inserts comprises a foam insert.

6. The arrow quiver assembly according to claim 1, wherein the blades of at least one of the respective broadheads are rotated within the respective oval-shaped insert such that the blades are positioned substantially parallel to the plane formed by the first principal axis and the second principal axis.

7. An arrow quiver assembly, comprising: a frame, the frame comprising:
   a first principal axis;
   a second principal axis of a length shorter than the first principal axis and extending in a direction substantially perpendicular to the first principal axis;
   a seating surface substantially positioned within a plane formed by the first principal axis and the second principal axis, configured to matingly engage with a first mounting post extending from a bow;
   a second mounting post extending from an end portion of the frame and in a direction perpendicular to the plane formed by the first principal axis and the second principal axis, wherein the second mounting post is configured to matingly engage with a concave surface of a camming arm on the bow; and
   wherein the camming arm comprises a set screw positioned proximate the concave surface, and
   the set screw is adjustable to allow a variable force to be utilized to matingly engage the second mounting post with the concave surface of the camming arm on the bow.

8. The arrow quiver assembly according to claim 7, wherein the second mounting post is configured to matingly engage with the concave surface of the camming arm of the bow by rotating the frame and the second mounting post such that the second mounting post is positioned into a secured position within the concave surface of the camming arm.

9. The arrow quiver assembly according to claim 8, wherein the secured position is obtained by rotating the frame and the second mounting post such that the second mounting post directly contacts the set screw during at least a portion of the time of rotation.

10. The arrow quiver assembly according to claim 7, wherein the set screw is threaded.

11. The arrow quiver assembly according to claim 10, wherein a thread locker is used to secure the set screw in place.

12. The arrow quiver assembly according to claim 7, wherein the second mounting post comprises a compliant material.

13. The arrow quiver assembly according to claim 12, wherein the compliant material is selected from the group consisting of rubber, thermoplastic vulcanizate (TPV), thermoplastic elastomer (TPE), thermoplastic polyurethane (TPU), and molded silicone.

14. An arrow quiver assembly comprising: a frame, the frame comprising:
   a horizontal top surface extending in a direction of a first axis;
   a horizontal bottom surface extending in the direction of the first axis having a first mounting post extending therefrom in a direction perpendicular to a plane formed by the first axis and a second axis substantially perpendicular to the first axis, wherein the first mounting post is configured to matingly engage with a concave surface of a camming arm on a bow;
   a first curved side surface with three points of inflection, wherein end points of the first curved surface contact a first endpoint of the horizontal top surface and a first endpoint of the horizontal bottom surface, wherein the first curved side extends in a direction of a second axis that is substantially perpendicular to the first axis;
   a second curved side surface with three points of inflection, wherein end points of the second curved surface contact a second endpoint of the horizontal top surface and a second endpoint of the horizontal bottom surface, wherein the second curved side extends in the direction of the second axis;
   a horizontal surface positioned approximately midway between the horizontal top surface and the horizontal bottom surface, the horizontal surface having a first endpoint that contacts the first curved side surface and a second endpoint that contacts the second curved side surface;
   a first curved surface extending in the direction of the first axis, having one point of inflection, and having respective endpoints contacting the first curved side surface and the second curved side surface and;
   a second curved surface extending in the direction of the first axis, having one point of inflection, and having respective endpoints contacting the first curved side surface and the second curved side surface, wherein the second curved surface is positioned between the horizontal bottom surface and the first curved surface, wherein the second curved surface is configured to matingly engage with a second mounting post extending from the bow;
   wherein the camming arm comprises a set screw positioned proximate the concave surface, and the set screw is adjustable to allow a variable force to be utilized to matingly engage the first mounting post and the concave surface of the camming arm.

15. The arrow quiver assembly according to claim 1, wherein the frame comprises at least one material selected from the group consisting of aluminum, magnesium, zinc and copper.

16. The arrow quiver assembly according to claim 11, wherein the thread locker is a chemical thread locker or a mechanical thread locker.

17. The arrow quiver assembly according to claim 7, wherein the set screw is adjustable to allow a surface of the set screw to extend a variable distance beyond a surface of the camming arm.

* * * * *